US006334638B1

(12) United States Patent
Yamamuro et al.

(10) Patent No.: US 6,334,638 B1
(45) Date of Patent: Jan. 1, 2002

(54) ATTACHMENT STRUCTURE FOR BUMPER BEAM

(75) Inventors: Shirou Yamamuro; Shigeo Fujita, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/644,842

(22) Filed: Aug. 24, 2000

(30) Foreign Application Priority Data

Aug. 24, 1999 (JP) .......................................... 11-236849

(51) Int. Cl.⁷ .......................... B60R 19/24; B60R 19/26
(52) U.S. Cl. ...................... 293/133; 293/132; 293/154; 293/155
(58) Field of Search ................................ 293/132, 133, 293/154, 155

(56) References Cited

U.S. PATENT DOCUMENTS

| | | | |
|---|---|---|---|
| 3,840,260 A | * 10/1974 | Wacker et al. ................. | 293/86 |
| 4,152,012 A | 5/1979 | Reidelbach et al. | |
| 4,413,856 A | * 11/1983 | McMahan et al. ........... | 296/188 |
| 4,829,979 A | * 5/1989 | Moir ........................... | 293/132 |
| 5,056,840 A | * 10/1991 | Eipper et al. ............... | 293/120 |
| 5,201,912 A | * 4/1993 | Terada et al. ............... | 293/120 |
| 5,876,077 A | * 3/1999 | Miskech et al. ............ | 293/132 |

FOREIGN PATENT DOCUMENTS

| | | | |
|---|---|---|---|
| EP | 0 546352 A1 | 6/1993 | |
| JP | 406211091 A | * 8/1994 | ................. 293/133 |
| JP | 7-304462 | 11/1995 | |
| WO | 97/03865 | 2/1997 | |

OTHER PUBLICATIONS

German Office Action dated Aug. 2, 2001, with English–translation, for the corresponding German application.

* cited by examiner

Primary Examiner—Stephen T. Gordon
Assistant Examiner—Greg Blankenship
(74) Attorney, Agent, or Firm—Arent Fox Kintner Plotkin & Kahn, PLLC (57) ABSTRACT

In an attachment structure of a bumper beam of the present invention, in which a bumper stay is attached to the end portion of each of rear side frames of an automobile and a bumper beam 23 is attached to the bumper stays, each of the bumper stays 22 is formed as a combined unit formed by an impact absorbing member 26 which is deformed to absorb impact when the impact force is applied to the bumper beam 23 and a holding member 25 having rigidity larger than the impact absorbing member 26, the holding members 25 are attached to the end portions 21, 21 of the rear side frames 17, 17, the holding member 25 is combined with the impact absorbing member 26, and the bumper beam 23 is attached to the impact absorbing members 26.

6 Claims, 8 Drawing Sheets

ATTACHMENT STRUCTURE FOR BUMPER BEAM

BACKGROUND OF THE INVENTION

1. Field of the Invention

The present invention relates to an attachment structure of a bumper beam for an automobile.

2. Description of the Related Art

An example of the attachment structure of a bumper beam for an automobile is disclosed in Japanese Patent Unexamined Publication No. Hei. 7-304462 (JP-A-7-304462) entitled "Front body structure of automobile", for example. According to this conventional art, this body structure is arranged in a manner that a front module (a bulk head, a bumper beam, a bumper face, a front grill, a head light brackets) is coupled to a front body frame of an automobile. This body structure will be explained with reference to the main portion of the front body structure for an automobile of the publication shown in FIG. 8. In FIG. 8, the reference numerals of the constituent elements of the front body structure are renumbered.

Figure 8A:
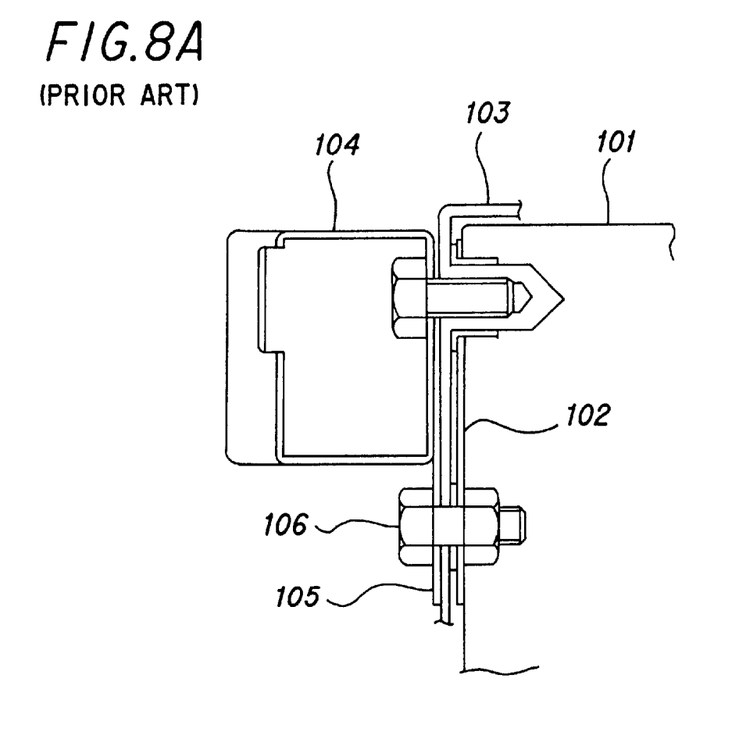
FIGS. 8A and 8B are diagrams for explaining the problem of the conventional attachment structure of a bumper beam.
Figure 8B:
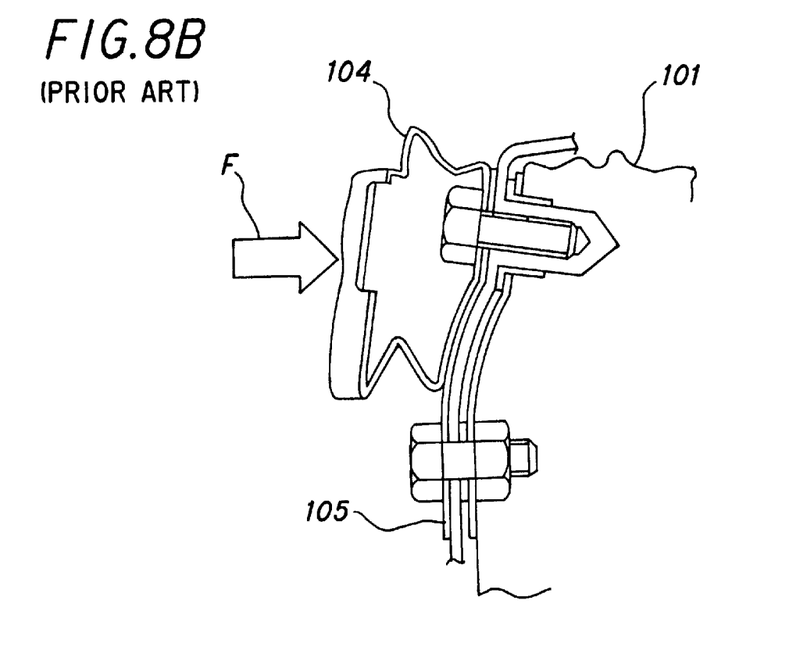

FIGS. 8A and 8B are diagrams for explaining the problem of the conventional attachment structure of a bumper beam.

FIG. 8A shows the structure same as shown in the publication, wherein a flange 102 is fixed to the front end of a side member 101, and an attachment bracket 105 for a bulk head 103 and a bumper beam 104 is attached to the flange 102 by means of formally fastening bolts 106.

FIG. 8B shows the case where the impact is applied to the bumper beam 104. When the impact force F acts on the bumper beam 104, the impact force F is directly applied to the side member 101 from the bumper beam 104, so that the side member 101 may be deformed.

In this manner, when the side member 101 (body frame) is deformed, it is required to exchange the bumper beam 104 and repair the body frame. Thus, a lot of trouble is required for the exchanging and the repairing.

There is a method of making the size of the bumper beam 104 longer in order to prevent the deformation of the side member 101. However, in this case, since the protruded length (overhang amount) of the bumper beam 104 becomes large, the degree of the freedom at the time of designing the front or rear portion is lowered.

SUMMARY OF THE INVENTION

Accordingly, an object of the invention is to provide the attachment structure for a bumper beam which can easily repair and improve the degree of the freedom of the design.

In order to attain the aforesaid object, the invention according to a first embodiment is arranged in a manner that in an attachment structure of a bumper beam in which a bumper stay is attached to an end portion of each of front side frames or rear side frames of an automobile and a bumper beam is attached to the bumper stays, the attachment structure of a bumper beam comprises each of the bumper stays formed as a combined unit formed by an impact absorbing member which is deformed to absorb impact when impact force is applied to the bumper beam and a holding member having rigidity larger than the impact absorbing member, the holding members are attached to the end portions of the rear side frames or the front side frames, the holding member is combined with the impact absorbing member, and the bumper beam is attached to the impact absorbing members.

In this manner, each of the bumper stays is formed as the combined unit formed by the impact absorbing member and the holding member, and the holding member having the rigidity larger than the impact absorbing member is attached to the frame side. When the impact force acts on the bumper beam, the impact absorbing member is deformed to absorb the impact. In contrast, the holding member is not deformed to protect the frame side. As a result, when repairing the bumper, it is required to merely exchange the impact absorbing members together with the bumper beam.

Further, since the impact absorbing members can efficiently absorb the impact and the holding member can distribute the impact acting on the frame, the overhang amount of the bumper beam can be made small and so the degree of the freedom at the time of designing can be improved.

According to a second embodiment of the present invention, in the attachment structure of the first embodiment, the holding member is formed by an extruded member whose sectional configuration is uniform in axial direction thereof.

Since the holding members can be manufactured continuously, the manufacturing efficiency of the holding members can be improved.

Further, since the holding member is formed by the extruded member, the thickness of the holding member is made large only at the portion where a large stress is applied but small at the portions where a small stress is applied. As a result, the holding member can be light-weight.

DETAILED DESCRIPTION OF THE PREFERRED EMBODIMENT

The embodiment of the invention will be explained with reference to the accompanying drawings. The drawings will be seen according to the direction of reference numerals. In the description, "left" and "right" represent the left and right direction seen from a driver, respectively, "front" represents the travelling direction of an automobile and "rear" represents the direction opposite to the travelling direction.

Figure 1:
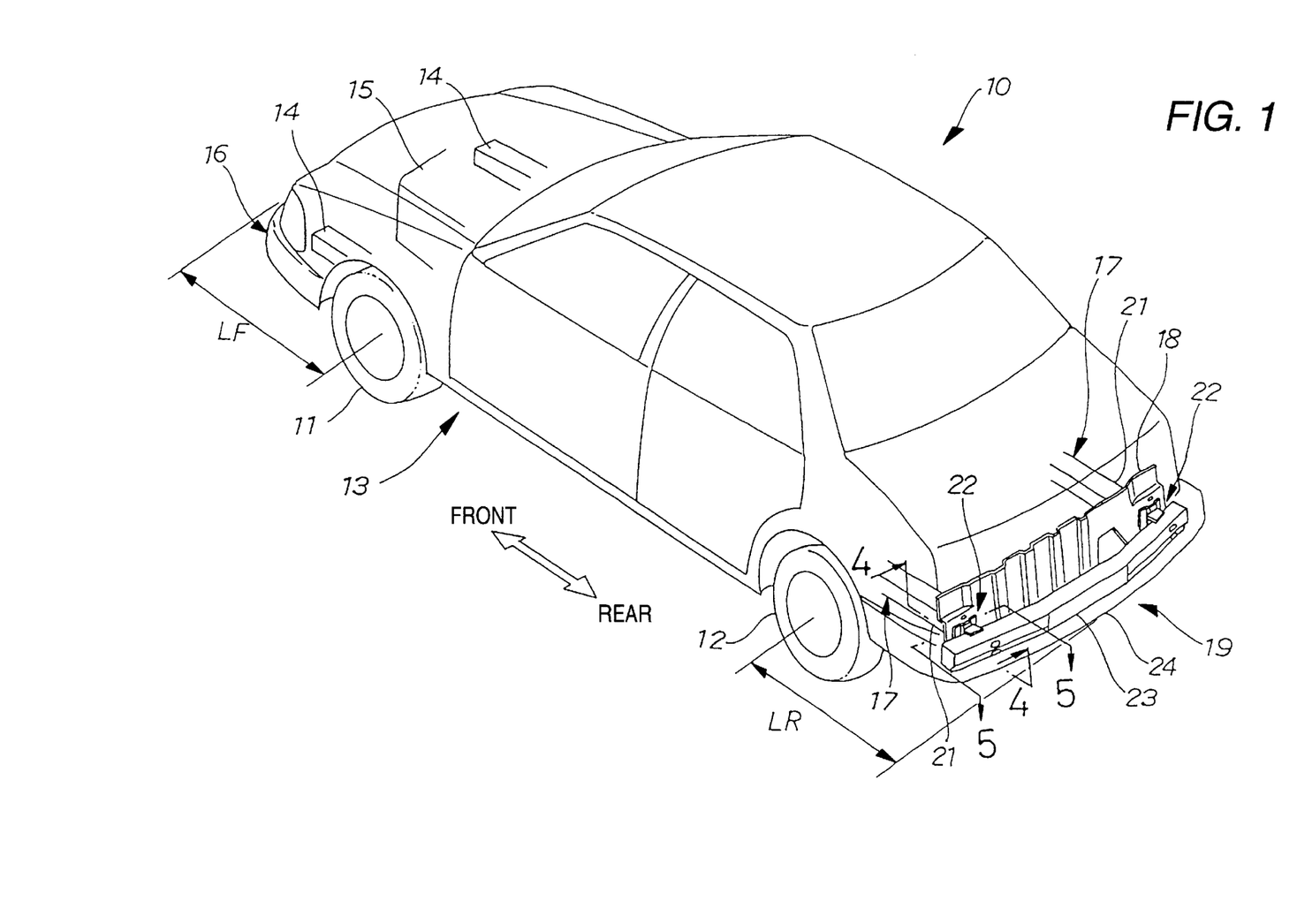
FIG. 1 is a perspective view of an automobile provided with the attachment structure for a bumper beam according to the invention.

FIG. 1 is a perspective view of an automobile provided with the attachment structure for a bumper beam according to the invention. An automobile 10 includes front side frames 14, 14, an engine 15 and a front bumper 16 at the front portion of a vehicle body 13 provided with front wheels 11 and rear wheels 12 and also includes rear side frames 17, 17, a rear panel 18 and a rear bumper 19 at the rear portion of the vehicle body 13. In the figure, LF depicts a front overhang amount and LR depicts a rear overhang amount.

Figure 2:
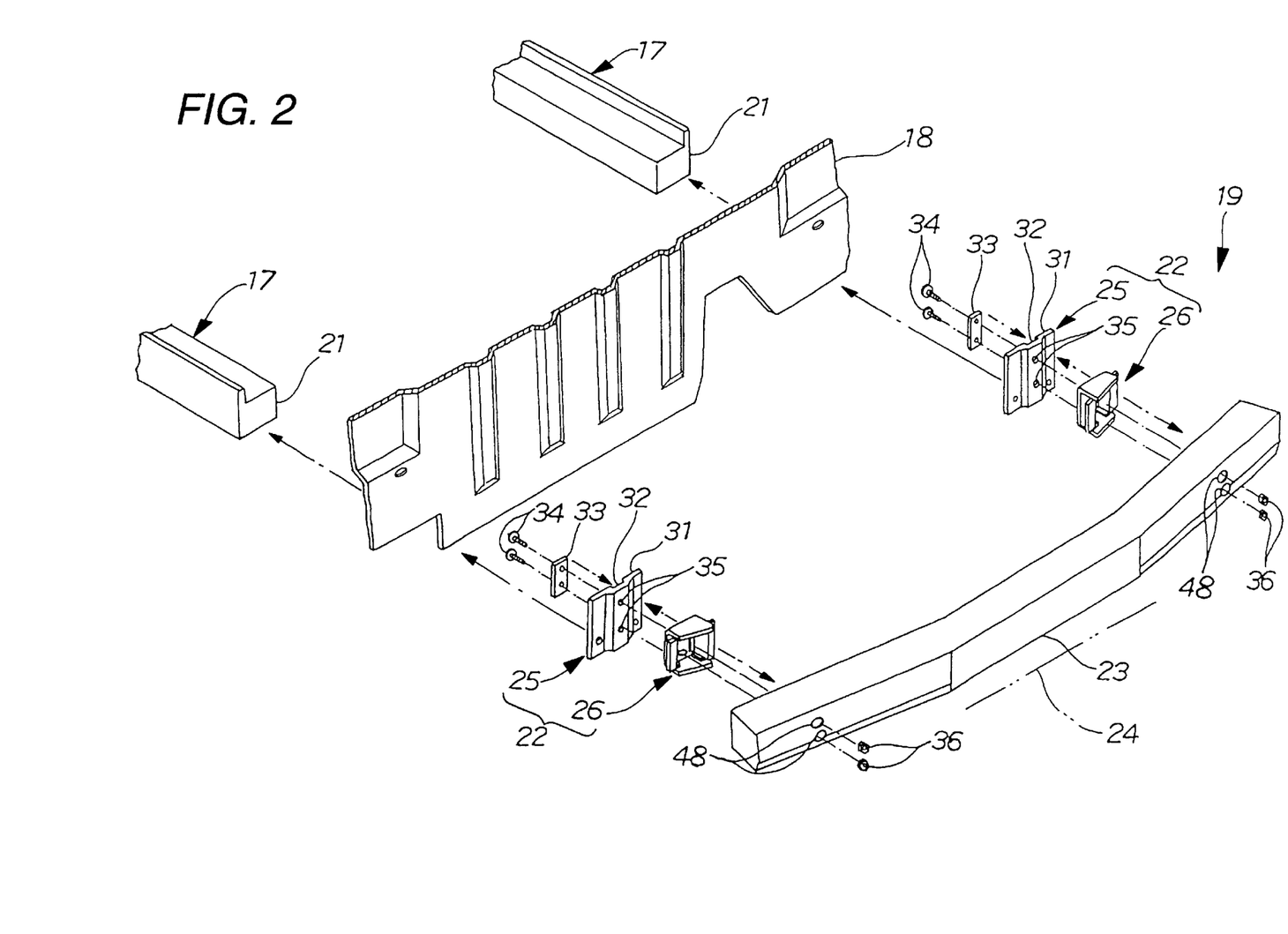
FIG. 2 is an exploded perspective view of the rear bumper according to the invention.

FIG. 2 is an exploded perspective view of the rear bumper according to the invention. The rear bumper 19 includes bumper stays 22 attached to the end portions 21, 21 of the rear side frames 17, 17, a bumper beam 23 attached to the bumper stays 22, 22, and a bumper cover 24 covering the bumper beam 23.

The bumper stay 22 is a combined unit formed by a holding member 25 attached to the end portion 21 of the rear side frame 17 and an impact absorbing member 26 to be combined with the holding member 25.

To be more concrete, the holding member 25 is formed by a frame welding portion 31 to be welded to the rear side frame 17, a bolt housing portion 32 formed at the center portion of the frame welding portion 31, an attachment piece 33 to be welded to the bolt housing portion 32, bolts 34, 34 to be welded to the attachment piece 33 and bolt through holes 35, 35 formed at the bolt housing portion 32 for passing the bolts 34, 34 therethrough. The holding member 25 is formed by material such as aluminum (hereinafter aluminum represents aluminum alloy as well as aluminum). Reference numerals 36 - - - (hereinafter "- - -" represents plural members) depicts nuts.

Figure 3:
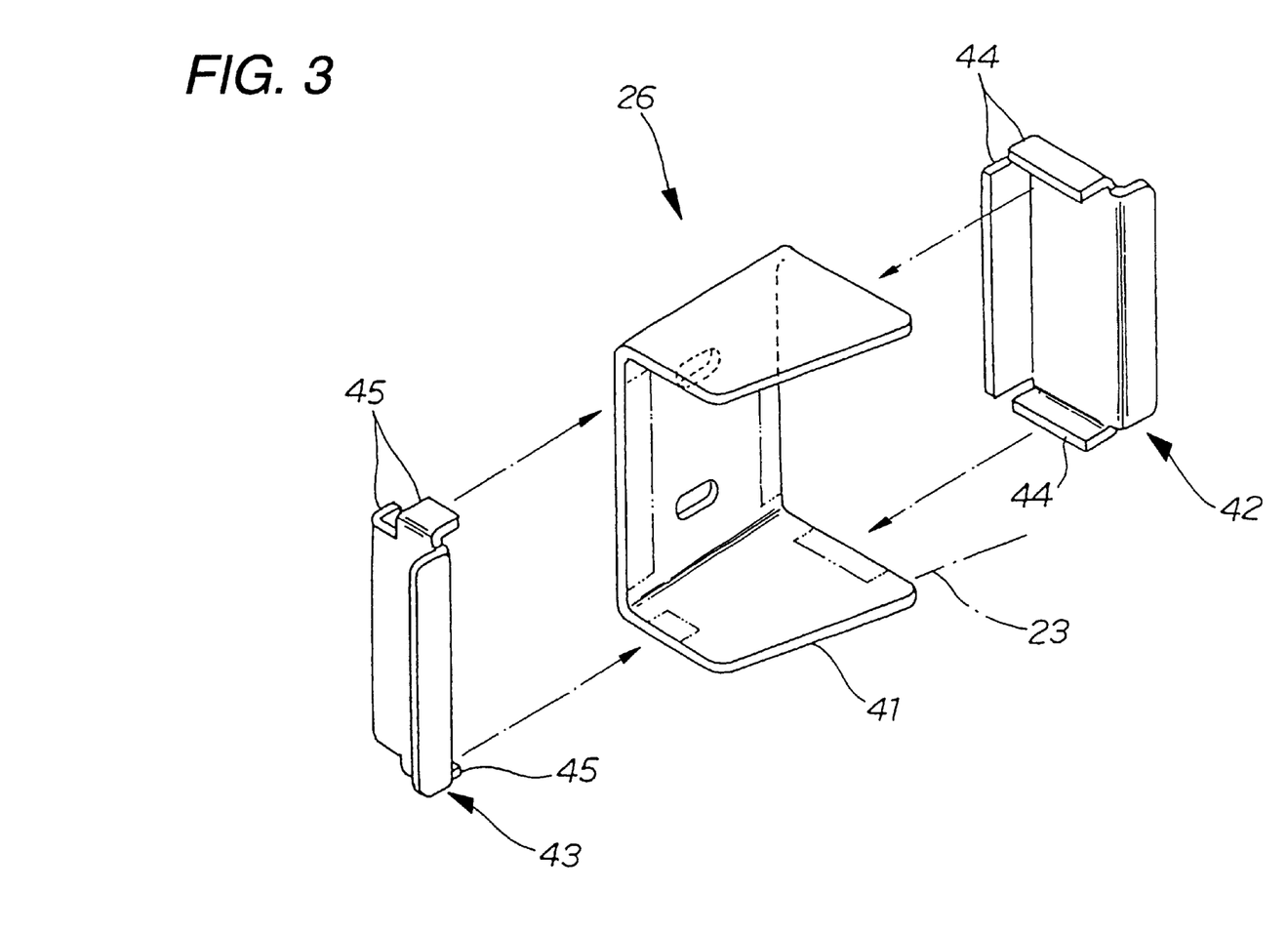
FIG. 3 is an exploded perspective view of the impact absorbing member according to the invention.

FIG. 3 is an exploded perspective view of the impact absorbing member according to the invention. The impact absorbing member 26 is a box shaped member made of aluminum which is formed in a manner that bending portions 44 - - -, 45 - - - of side plates 42, 43 are inserted into the right and left sides of a channel 41 and then the channel and the side plates are integrated by the welding process.

Figure 4:
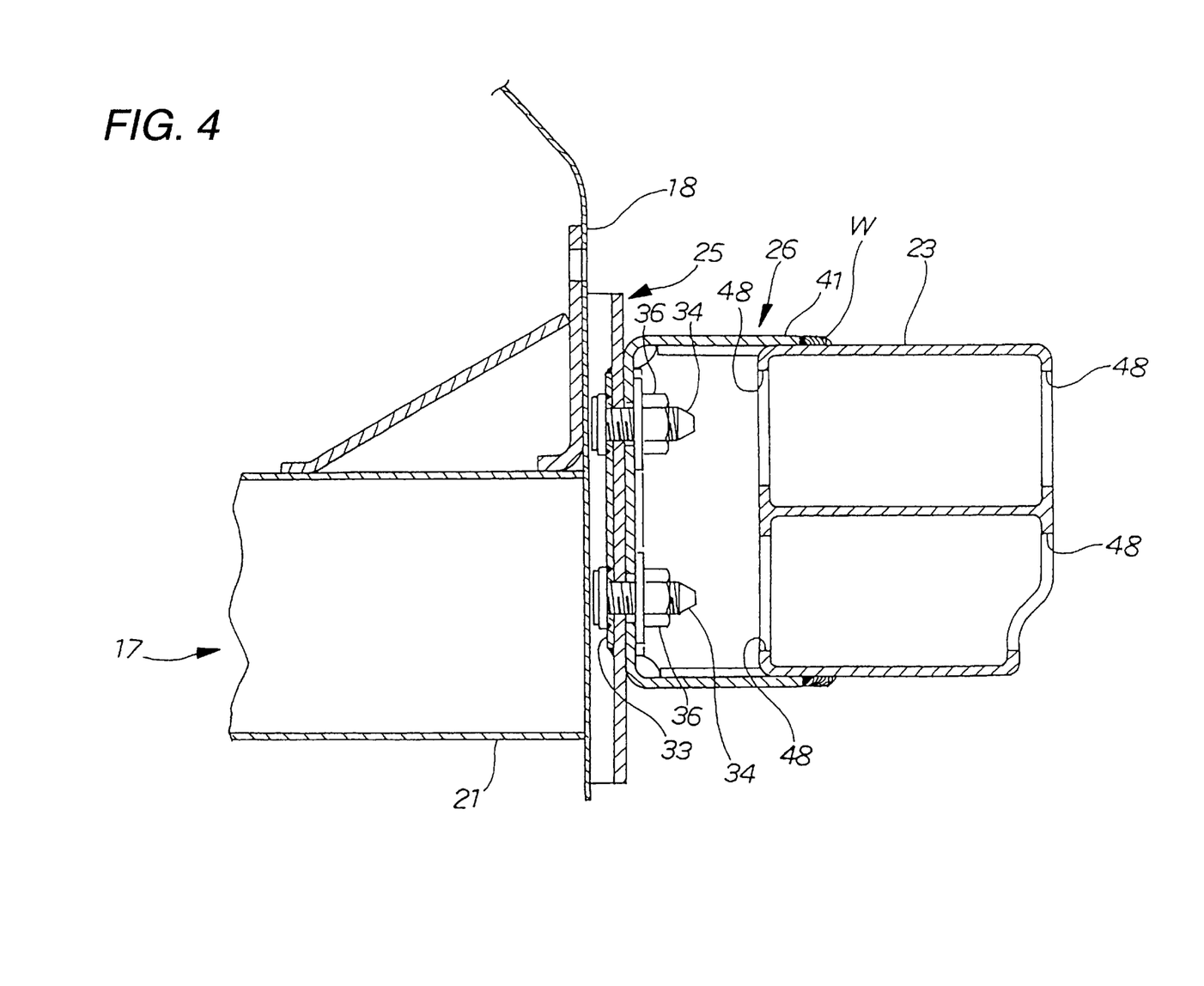
FIG. 4 is a sectional view cut away along a line 4—4 in FIG. 1.

FIG. 4 is a sectional view cut away along a line 4—4 in FIG. 1. The attachment procedure of the bumper beam 23 will be explained with reference to this figure. The bumper beam 23 is fixed to the impact absorbing member 26 by means of a fillet welding portion W to form a combined member thus fixed, then the combined member is abutted against the holding member 25 and the nuts 36, 36 are screwed onto the bolts 34, 34 to secure them. In this case, through holes 48 - - - serve to pass the nuts 36, 36 and not-shown nut runners therethrough.

Figure 5:
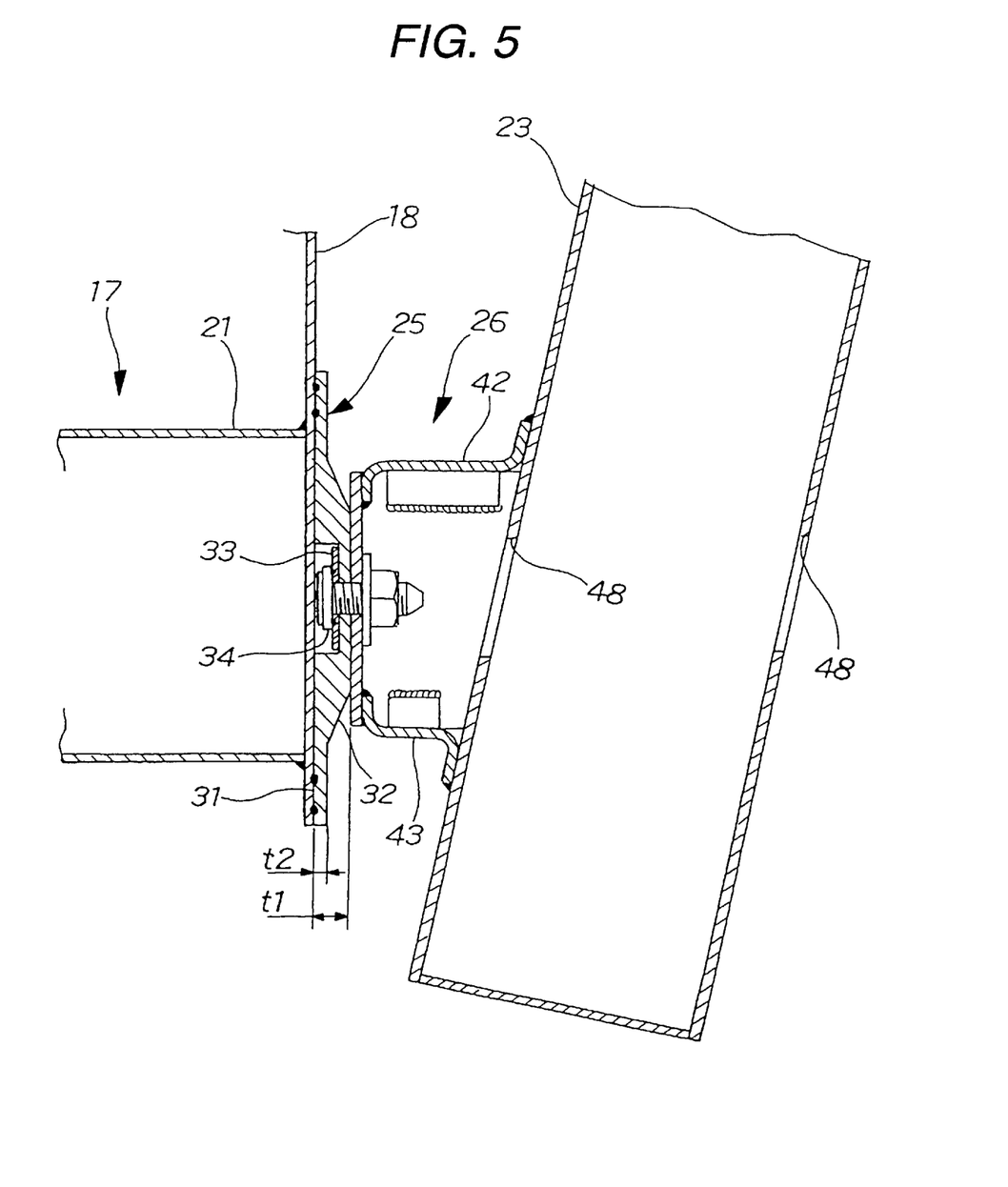
FIG. 5 is a sectional view cut away along a line 5—5 in FIG. 1.

FIG. 5 is a sectional view cut away along a line 5—5 in FIG. 1. The sectional configuration of the holding member 25 will be explained in detail with reference to this figure. Supposing that the thickness of the bolt housing portion 32 formed at the center portion is t1 and the thickness of the frame welding portions 31 formed at both sides of the holding member is t2, the thickness t1 at the center portion is about three times as large as the thickness t1 at the both sides. That is, when the impact acts on the holding member 25, a large stress is applied to the center portion thereof but a small stress is applied to both sides thereof, and so the thickness of the holding member is made large at the center portion but made small at the both sides. As a result, the holding member can secure high intensity and light-weighting. Further, since both sides can be made thin, the welding property of the spot welding can be improved.

Figure 6A:
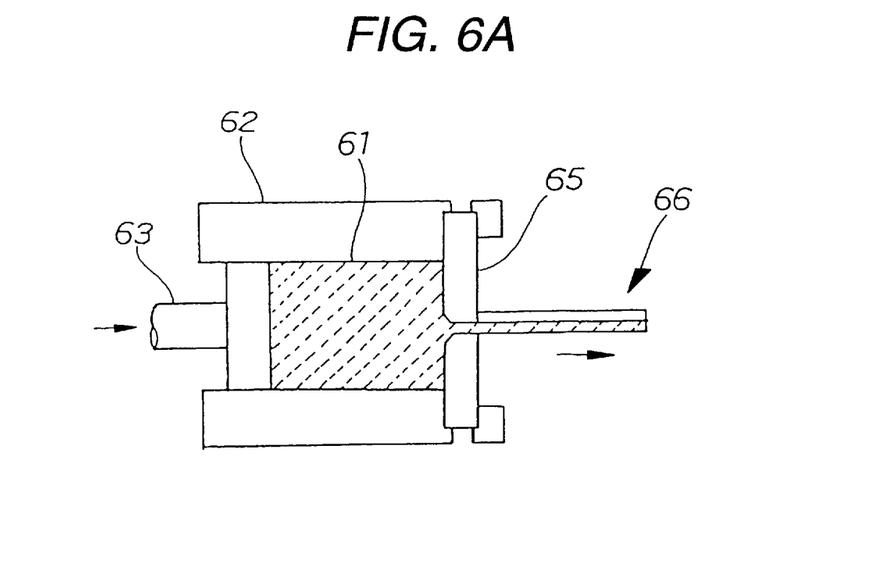
FIGS. 6A and 6B are diagrams for explaining the processing procedure of the holding member according to the invention.
Figure 6B:
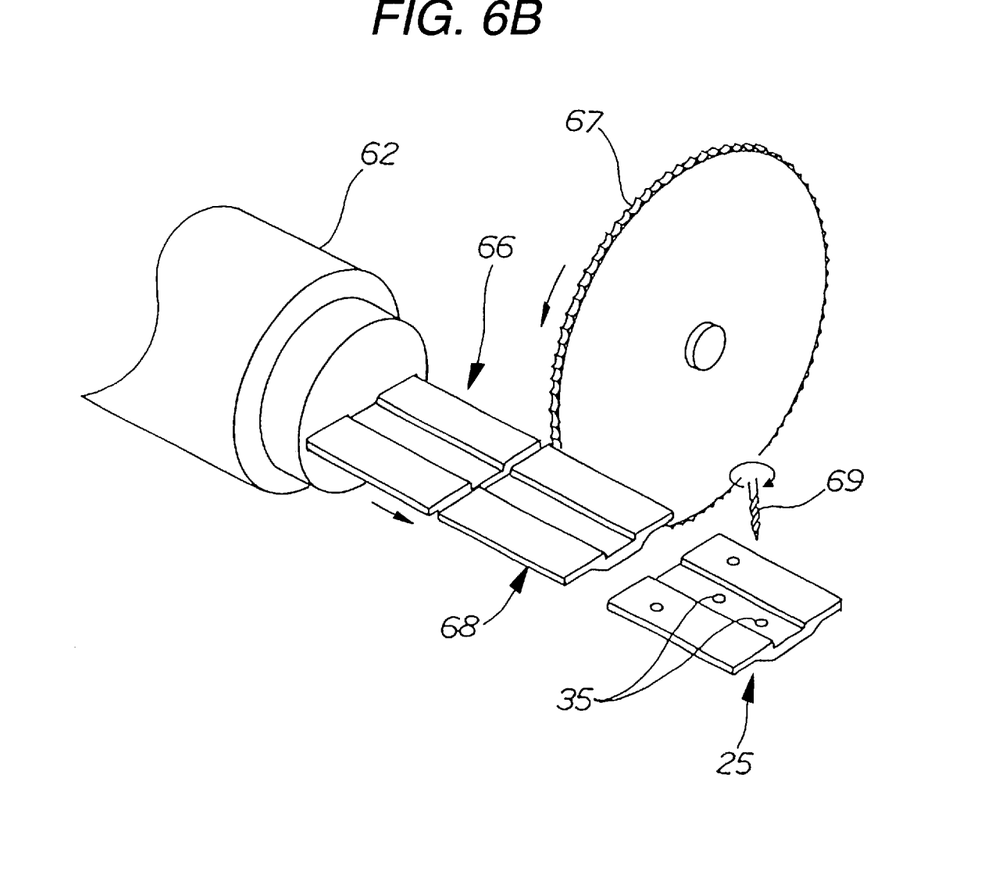

FIGS. 6A and 6B are diagrams for explaining the processing procedure of the holding member according to the invention.

FIG. 6A, first, billet 61 of aluminum is inserted into a container 62 and pushed out by a ram 63, whereby the billet is formed into an extruded member 66 of holding member through a die 65.

As shown in FIG. 6B, then, the extruded member 66 is cut into constant size members 68 each having a predetermined length by means of a cutting tool 67. The constant size member 68 is provided with bolt through holes 35, 35 by means of a drill 69, thereby completing the holding member 25.

In this manner, since the holding member 25 is formed by the extruded member 66 whose sectional configuration is uniform in the axial direction thereof, the holding members 25 can be manufactured continuously, so that the manufacturing efficiency of the holding members 25 can be improved.

The action of the aforesaid attachment structure for a bumper beam will be explained.

Figure 7A:
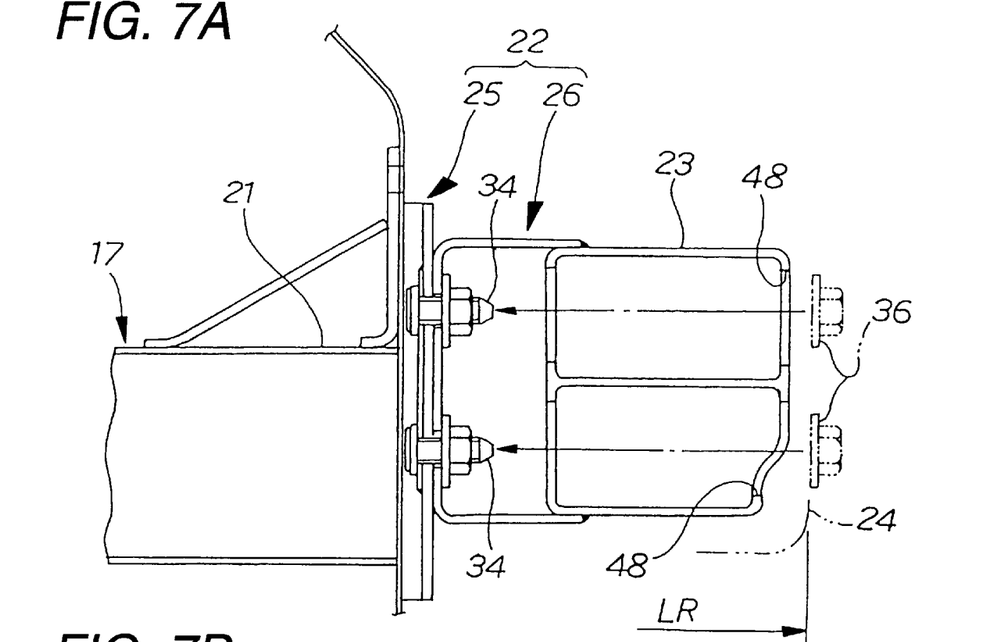
FIGS. 7A and 7B are diagrams for explaining the action of the attachment structure for a bumper beam according to the invention.
Figure 7B:
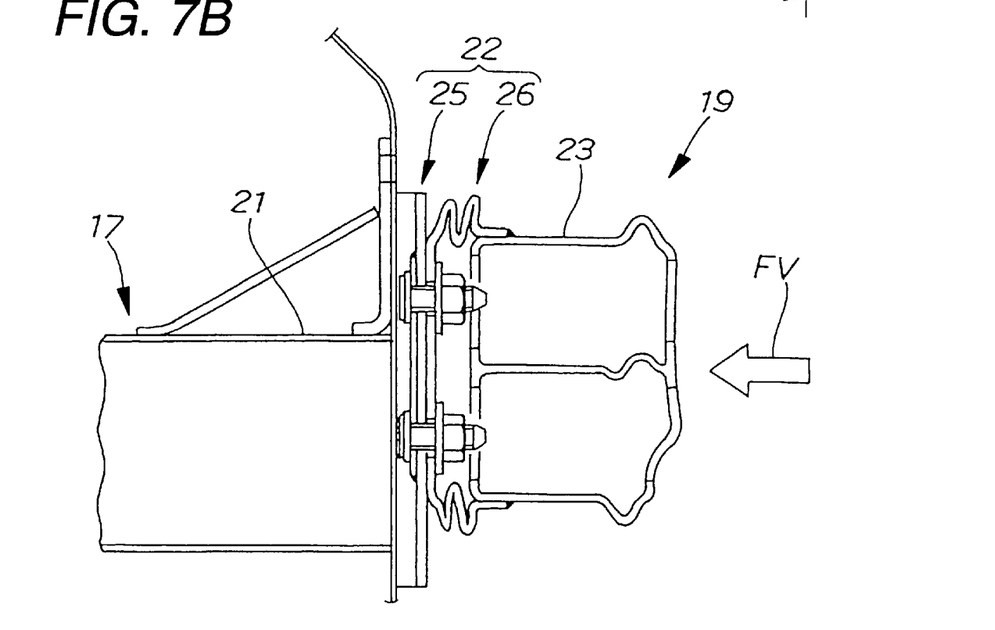

FIGS. 7A and 7B are diagrams for explaining the action of the attachment structure for a bumper beam according to the invention. FIG. 7A is a sectional diagram of the rear bumper and FIG. 7B is a diagram showing the case where the rear bumper shown in FIG. 7A is applied with impact.

In FIG. 7A, since the holding member 25 having the rigidity larger than the impact absorbing member 26 is attached to the end portion 21 of the rear side frame 17, not only the holding member 25 itself is prevented from being deformed but also the impact acting on the rear side frame 17 is distributed by the entire surface of the holding member 25. As a result, even if the rear overhang amount LR of the bumper beam 23 is made small, the rear side frame 17 and the holding members 25 of the bumper stay 22 are prevented from being deformed. Accordingly, the rear overhang amount LR can be made small and so the degree of the freedom at the time of designing can be improved.

Further, since the bolts 34, 34 are welded to the holding member 25 and the through holes 48 are formed at the bumper beam 23, the nuts 36, 36 can be passed through the through holes 48, 48 and so the screwing operation of the nuts 36, 36 can be carried out. Thus, the bumper beam 23 can be attached and removed easily.

In FIG. 7B, when the impact force FV (for example, when the automobile collides at a speed of about 8 km/hour) acts on the bumper beam 23, the impact absorbing member 26 is deformed to absorb the impact. Simultaneously, the bumper beam 23 is partially deformed to absorb the impact. In contrast, since the holding member 25 has a larger rigidity than the impact absorbing member 26, the holding member is prevented from being deformed by the impact force FV. Accordingly, when repairing the rear bumper 19, since it is required to merely exchange the bumper beam 23 and the impact absorbing members 26, the repairing operation can be performed quite easily.

Further, since the impact absorbing member 26 is formed by the plate member, the configuration thereof is quite simple and the number of the parts thereof is small, so that manufacturing cost of the impact absorbing member can be reduced and the bumper can be light-weight.

The attachment structure for a bumper beam shown in the embodiment according to the invention may also be employed in the front bumper.

The invention configured in the aforesaid manner can attain the following effects.

According to claim 1 of the invention, since the holding member having the rigidity larger than the impact absorbing member is attached to the end portion of the rear side frame, when the impact force acts on the bumper beam, the impact absorbing member is deformed to absorb the impact. As a result, both the rear side frame and the holding member are prevented from being deformed. Accordingly, when repairing the rear bumper, since it is required to merely exchange the bumper beam and the impact absorbing members, the repairing process can be performed quite easily.

Further, since the holding member of the bumper stay is designed to have a rigidity larger than the impact absorbing member thereof, the holding member itself can be prevented from being deformed. Simultaneously, since the impact acting on the rear side frame is distributed by the entire surface of the holding member, the rear side frame can be prevented from being deformed. As a result, even if the overhang amount of the bumper beam is made small, both the rear side frame and the holding member of the bumper stay can be prevented from being deformed. Accordingly, since the rear overhang amount of the bumper beam can be made small, the degree of the freedom at the time of designing can be improved.

According to claim 2 of the invention, since the holding member is formed by the extruded member whose sectional configuration is uniform in the axial direction, the holding members can be manufactured continuously, so that the manufacturing efficiency of the holding members can be improved. Thus, the manufacturing cost of the holding member can be reduced.

Further, since the holding member is formed by the extruded member, the thickness of the holding member can be made large only at the portion where a large stress is applied, so that the holding member can be light-weight.

What is claimed is:

1. An attachment structure for a vehicle having a longitudinal axis comprising:

a side frame substantially parallel to the longitudinal axis of the vehicle;

a bumper stay attached to an end portion of said side frame; and a bumper beam attached to said bumper stay, wherein said bumper stay comprising an impact absorbing member which is deformed to absorb impact when impact force is applied to said bumper beam and a holding member having rigidity larger than said impact absorbing member, and wherein said holding member is attached to said end portion of said side frame, said holding member is combined with said impact absorbing member while said bumper beam is attached to said impact absorbing member.

2. The attachment structure of a bumper beam according to claim 1, wherein said holding member is formed by an extruded member and wherein a sectional configuration of said extruded member is uniform in axial direction thereof.

3. The attachment structure of a bumper beam according to claim 1, wherein said side frame is a front side frame.

4. The attachment structure of a bumper beam according to claim 1, wherein said side frame is rear side frame.

5. The attachment structure of a bumper beam according to claim 1 wherein a thickness of said holding member is set at a portion thereof by adjusting the thickness according to an amount of stress applied to said portion.

6. The attachment structure of a bumper beam according to claim 1 wherein a center portion of said holding member has larger thickness than both sides of said holding member.

* * * * *